United States Patent [19]

Barone

[11] 3,990,173

[45] Nov. 9, 1976

[54] BAT TRAP

[76] Inventor: Anthony C. Barone, 407 Glenwood Ave., Williamsport, Pa. 17701

[22] Filed: Sept. 22, 1975

[21] Appl. No.: 615,634

[52] U.S. Cl. .................................. 43/77; 43/26.1

[51] Int. Cl.[2] ...................................... A01M 23/00

[58] Field of Search .......... 43/26.1, 26.2, 35, 77–96

[56] References Cited

UNITED STATES PATENTS 788,047 4/1905 Holz et al. .......................... 43/26.1

*Primary Examiner*—Hugh R. Chamblee
*Assistant Examiner*—Peter K. Skiff
*Attorney, Agent, or Firm*—Sughrue, Rothwell, Mion, Zinn and Macpeak

[57] ABSTRACT

A motor mounted on the ceiling of an attic room or the like drives an assembly or a disc suspended therefrom in slow rotation about a vertical axis and one or more short length lines fixed to the periphery of the assembly or disc carries at their outboard ends, artificial fishing flies to simulate insects. Slow rotation of the assembly or disc simulates insect flight preferably illuminated by a low intensity lamp and causes the bat to grab a fly, and become hooked thereby.

5 Claims, 2 Drawing Figures

BAT TRAP

BACKGROUND OF THE INVENTION

Field of the Invention

This invention relates to bat traps, and more particularly, to a bat trap which effectively attracts and captures a bat seeking food.

Many home attics and other buildings having openings to the outside which attract bats, which while not exceedingly dangerous or harmful, tend to scare humans, particularly small children. Attempts have been made to provide bat traps capable of capturing the bats. However, bats travel only at night and seek darkened rooms such as attics, and since they readily take to flight this makes trapping and disposal of bats almost an impossibility.

SUMMARY OF THE INVENTION

The present invention provides a highly effective bat trap which causes the bat to trap himself in his attempt to satisfy his hunger. The highly effective bat trap comprises a thin planar disc or an assembly consisting of two support rods at right angles with each other preferably suspended from the ceiling in the attic room or the like and driven by a motor for rotation about a vertical axis driven by a motor whose ouput shaft is mechanically coupled to the disc or plane of the assembly for rotation the same. Preferably, a plurality of short lengths of nylon fish line are fixed at one end to the periphery of the disc or ends of the rods and carry on their free ends an artificial fishing fly, preferably a fishing fly, the motor being energized to rotate the disc at a speed limited to several rpms such that flies appear to be moving in the same manner as a natural insect. The bat sensing the fly, in a low light level environment, as a natural insect attempts to eat the same and hooks himself on the fly embedded hook.

DESCRIPTION OF THE PREFERRED EMBODIMENT

Figure 1:
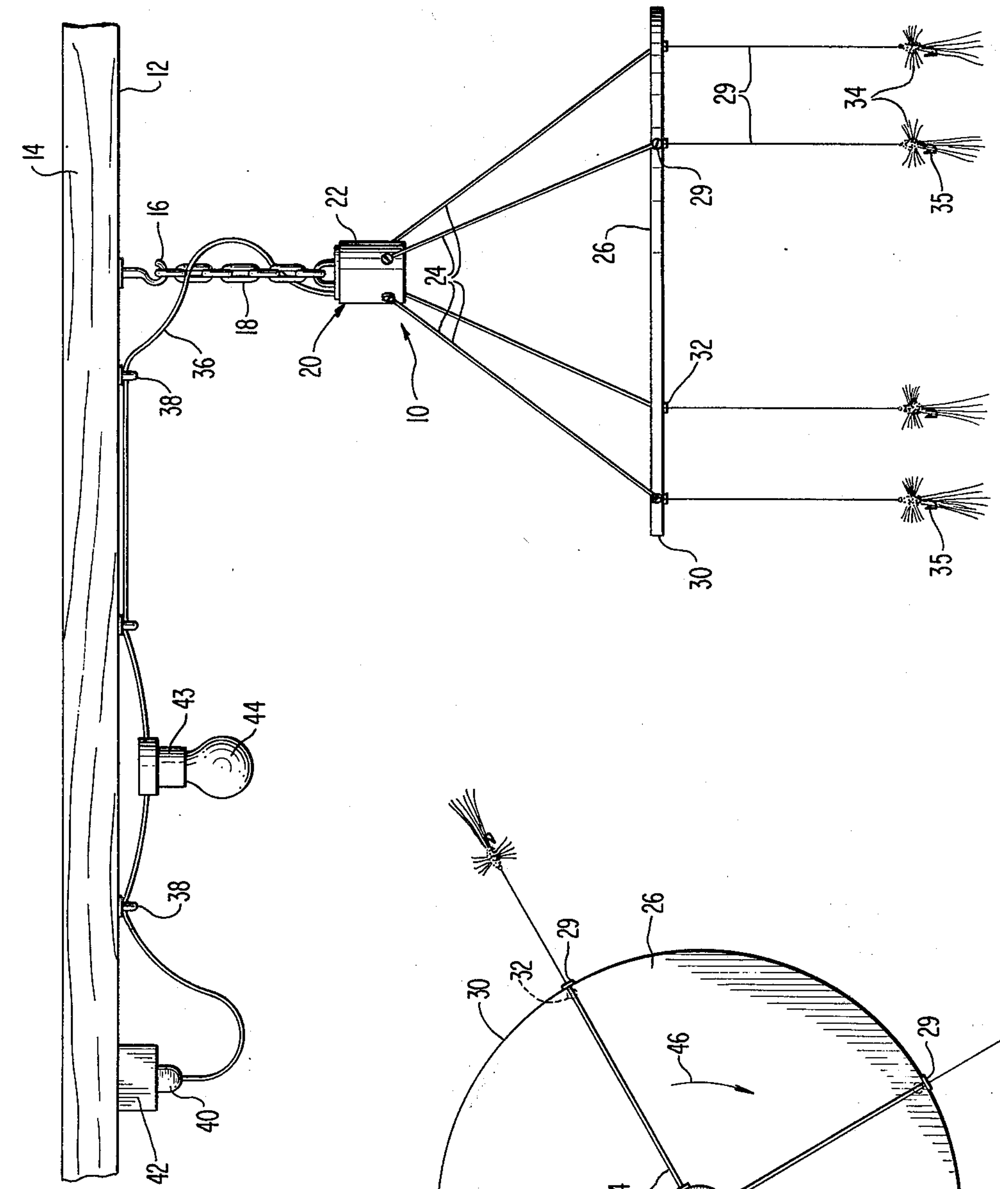
FIG. 1 is a side elevational view of the highly effective bat trap of the present invention as mounted on an attic or room or enclosure ceiling prior to motor energization.

Referring to the drawings, the highly effective bat trap of the present invention is particularly useful within attic rooms or the like rooms or enclosures, the bat trap indicated generally at 10 is suspended from a ceiling 12 of a typical attic room. The ceiling 12 includes a central, horizontal beam 14 on which a depending hook 16 is mounted. The hook 16 supports a length of metal chain 18 which may be of relatively short length, such as 6 inches, or may be several feet in length, dependent upon the desired location and height of the trap. Preferably, the length of chain 18 is relatively short, since it is intended that the trap be suspended from the ceiling of the attic or like room and energized periodically, after ascertaining the fact that a bat or bats are regularly occupying the room. Chain 18 supports from its lower end an electric motor 20 which may be of a conventional alternating current type and one which provides a relatively low rpm output. Motors having rheostat or resistance control may provide such low rpm. In the illustrated embodiment, the outer motor housing or rotor 22 rotates with respect to the interior of the motor to which the lower end of the chain 18 is attached. From the outer housing 22 there extends a plurality of relatively heavy metal wires 24 whose lower ends are affixed to the periphery of a planar wooden or plastic disc or member 26 by suitable attaching means such as screws or the like 29. Thus, the disc 26 is supported for rotation about a vertical axis, the disc being oriented generally horizontal and being centered with respect to the motor 20. A horizontal bar or multi-bar assembly may replace disc 26.

Important to the present invention is the utilization of one or more lengths of flexible line as at 28, there being shown four in number and being equally spaced circumferentially about the periphery 30 of the disc and being fixed thereto at their upper ends by suitable screws such as screws 32. The line may comprise nylon fish line, plastic monofilament, or the like, and may be from 1 foot to 3 or 4 feet in length, depending upon the size of the room and the rotative speed of the drive motor 20. Attached to the outboard ends of the short length lines 28 are conventional artificial fishing flies such as those employed in trout and bass fishing, the flies 34 taking the form of conventional wet or dry flies, including barbed hooks 35. The motor 20 is provided with electrical cord 36 permitting the chain 18, motor disc mounting wires 24, lines 28 and flies 34 to form an assembly which may be suitably transported from room to room. The ceiling beam 14 may also be provided with a number of depending hooks as at 36 and the electrical cord 36 leading to the motor 20 may terminate in a conventional male plug 40 for plugging into a conventional outlet fixture 42 also mounted to the ceiling beam 14. The cord 36 may appropriately be provided with a socket 43 within which is screwed a conventional light bulb 44. Obviously, the light bulb 44 is rotated such that it is on when the electrical current to the fitting 42 is on and the motor 20 is energized.

Figure 2:
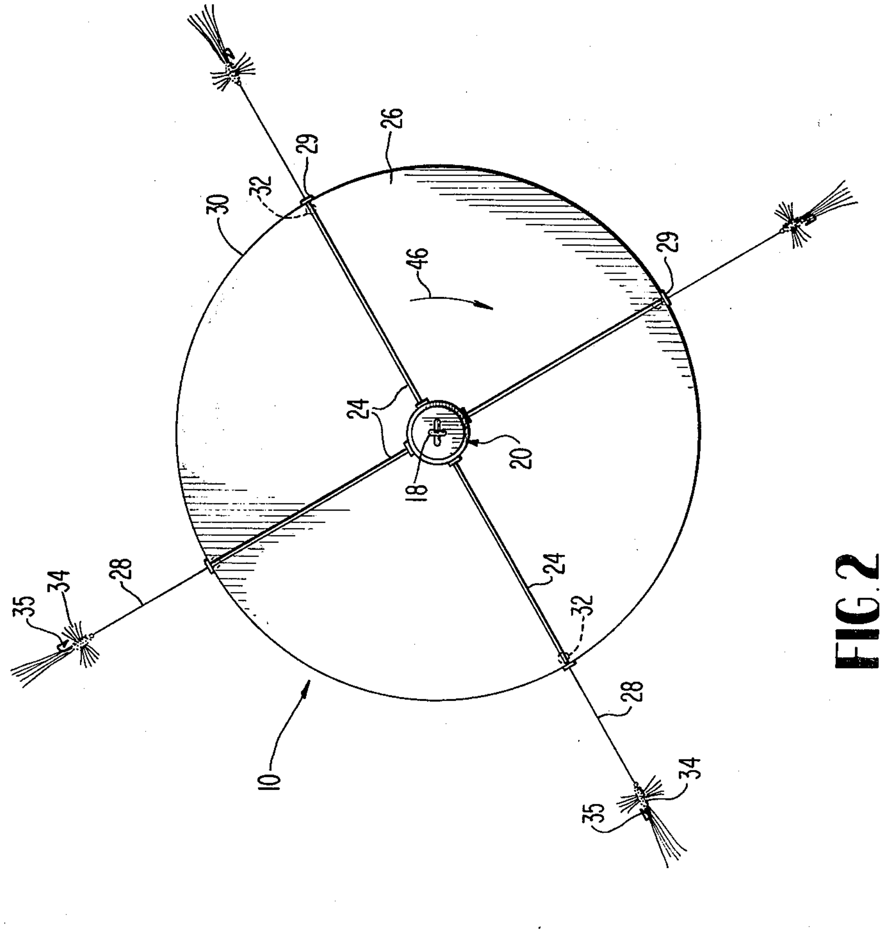
FIG. 2 is a top plan view of the bat trap of FIG. 1 during energization of the motor and slow rotation of the disc.

As may be apparent from the above description, energization of the light fixture 42 (with the light bulb 44 screwed to the non-illuminated or illuminated position), permits the motor 20 to rotate the disc 26 at several rpm causing the fine nylon fish lines 28 to incline outwardly of the disc periphery 30 as shown in FIG. 2 under centrifugal force by clockwise rotation as seen by arrow 46, and simulating flight of the artificial dry flies 34. The movement of the artificial dry flies 34 along a circular path outside of the periphery 30 of the disc simulates natural insects in flight and entices the bat to attack either in defense or attempted feeding. After hooking the bat, the continued rotation effectively serves to either kill or hold the bat since the bat cannot fly because the forced movement impales the bat upon the barbed hook 35 of a given fly 34 and prohibits the bat from escaping. Afterward the bat may be disposed of by use of a paper bag. The bat and fly are inserted into the bag and the bag tied shut, then the line above the fly is cut off, and a new fly tied thereto.

Various changes and modifications may be made, for instance, the motor may be directly mounted to the ceiling beam 14 and a motor shaft may rigidly connect the motor to the center of the disc 26. Alternatively, the motor base may be suspended by a fixed shaft or rod connected at one end of the ceiling beam 14 and the motor shaft adjacent the casing may be fixed directly to the disc 26 for rotating the same. Further, while the illustrated embodiment employs four artificial flies 34 spaced 90° apart relative to each other on the periphery, a single line and fly may be appropriate, although preferably multiple lines 28 and flies 34 should be employed with the ends of the lines 28 mounted to the disc periphery 30 at equally spaced circumferential positions. Further, while the lines 28 are shown as attached to the periphery of the disc 30 by way of screws 32, the lines may be suspended from the bottom of the disc for instance at any point radially outboard of the axis of rotation of the disc.

While the invention has been particularly shown and described with reference to a preferred embodiment thereof, it will be understood by those skilled in the art that various other changes in form and details may be made therein without departing from the spirit and scope of the invention.

What is claimed is:

1. A bat trap for catching bats within an attic room or the like, said trap comprising:

a rotatable member, means for slowly rotating said rotatable member about a vertical axis within said attic room, at least one light weight flexible line fixed at one end to said rotatable member radially outboard of the member axis of rotation and depending therefrom, and an artificial fishing fly attached to the other end of said line;

whereby, relatively slow rotation of said member causes said fly to simulate an insect moving in a circular path at natural speed about the vertical axis of rotation of said rotatable member which attracts the bat and hooks the same.

2. The bat trap as claimed in claim 1, wherein said rotatable member comprises a disc and wherein said means for rotating said disc comprises a motor including a rotor, said motor being suspended from a ceiling with said rotor rotating about a vertical axis and means for mounting said disc beneath said motor and coupled to said motor rotor for rotation thereby, and wherein each said line is fixed at one end to the periphery of said disc.

3. The bat trap as claimed in claim 2, wherein said motor is suspended from said ceiling by a length of chain and said disc is suspended from said rotor by a plurality of relatively stiff wires fixed at one end to said rotor and fixed at their other end to the periphery of the disc.

4. The bat trap as claimed in claim 3, wherein said light weight flexible lines are at least two in number and are circumferentially spaced and attached to the periphery of the disc so as to balance the weights acting on the rotating disc.

5. A highly effective bat trap for catching bats within an attic room or the like, said trap comprising in assembly:

a length of chain for suspension from the ceiling of the attic room or the like, a motor fixed to one end of said chain and having a rotor rotating about a vertical axis when suspended by said chain, an electrical cord extending from said motor and terminating in a male electrical plug for permitting energization of said motor when plugged into a suitable electrical fixture, a low level illumination lamp carried by said cord and electrically connected thereto, a plurality of relatively short length wires, each fixed at one end to said motor rotor and depending therefrom, a circular disc fixed at its periphery to the lower ends of said respective depending wires such that energization of said motor causes said disc to rotate slowly about the axis of the disc and said motor, and a plurality of short lengths of light flexible lines, each line fixed at an upper end to the periphery of the disc at equally circumferentially spaced locations, and an artificial fishing fly attached to the free ends of said line such that upon rotation of said motor said artificial fishing flies simulate moving insects to entice the bats.

* * * * *